(12) United States Patent
Smith

(10) Patent No.: US 11,108,099 B2
(45) Date of Patent: Aug. 31, 2021

(54) BATTERY ARRAY FRAME DESIGNS WITH STANDOFF FEATURES FOR REDUCING THERMAL INTERFACE MATERIAL USAGE

(71) Applicant: FORD GLOBAL TECHNOLOGIES, LLC, Dearborn, MI (US)

(72) Inventor: Micah Smith, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 136 days.

(21) Appl. No.: 16/104,982

(22) Filed: Aug. 20, 2018

(65) Prior Publication Data

US 2020/0058971 A1  Feb. 20, 2020

(51) Int. Cl.

| | |
|---|---|
| *H01M 10/6554* | (2014.01) |
| *H01M 10/6551* | (2014.01) |
| *H01M 2/10* | (2006.01) |
| *H01M 10/613* | (2014.01) |
| *H01M 10/625* | (2014.01) |
| *B60K 6/28* | (2007.10) |
| *B60L 58/26* | (2019.01) |
| *B60L 50/64* | (2019.01) |
| *H01M 50/20* | (2021.01) |

(52) U.S. Cl.
CPC .......... *H01M 10/6554* (2015.04); *B60K 6/28* (2013.01); *B60L 50/64* (2019.02); *B60L 58/26* (2019.02); *H01M 10/613* (2015.04); *H01M 10/625* (2015.04); *H01M 10/6551* (2015.04); *H01M 50/20* (2021.01); *B60Y 2200/91* (2013.01); *B60Y 2200/92* (2013.01)

(58) Field of Classification Search
CPC ......... H01M 10/6554; H01M 10/6551; H01M 2/1077; H01M 10/613; H01M 10/625; B60L 58/26; B60L 50/64; B60K 6/28; B60Y 2200/92; B60Y 2200/91
See application file for complete search history.

(56) References Cited

U.S. PATENT DOCUMENTS

| | | |
|---|---|---|
| 6,923,249 B1 | 8/2005 | Porter et al. |
| 8,268,472 B2 | 9/2012 | Ronning et al. |
| 8,268,474 B2 | 9/2012 | Kim et al. |
| 9,318,751 B2 | 4/2016 | Chorian et al. |
| 9,413,047 B2 | 8/2016 | Moschet et al. |
| 9,666,843 B2 | 5/2017 | Gunna et al. |
| 9,728,755 B2 | 8/2017 | Gunna et al. |
| 2009/0208829 A1 | 8/2009 | Howard et al. |
| 2011/0293982 A1* | 12/2011 | Martz ................. H01M 10/613 429/120 |
| 2013/0120910 A1* | 5/2013 | Watanabe .............. H01G 9/155 361/517 |

(Continued)

*Primary Examiner* — Lisa S Park
(74) *Attorney, Agent, or Firm* — David B. Kelley; Carlson, Gaskey & Olds

(57) ABSTRACT

This disclosure details exemplary battery pack designs for use in electrified vehicles. An exemplary battery pack may include a heat exchanger plate and a battery array positioned against the heat exchanger plate. The battery array may include an array frame and a thermal fin held within the array frame. The array frame may additionally include a standoff for controlling a size of a gap extending between the thermal fin and the heat exchanger plate. By controlling this gap, the amount of thermal interface material (TIM) that must be utilized to fill the gap can be reduced.

20 Claims, 5 Drawing Sheets

(56) References Cited

U.S. PATENT DOCUMENTS

| | | | |
|---|---|---|---|
| 2013/0183571 A1* | 7/2013 | Miyazaki | H01M 10/6557 429/156 |
| 2016/0036020 A1* | 2/2016 | Gunna | H01M 10/6551 429/99 |
| 2017/0309869 A1* | 10/2017 | Kim | H01M 10/0525 |

* cited by examiner

BATTERY ARRAY FRAME DESIGNS WITH STANDOFF FEATURES FOR REDUCING THERMAL INTERFACE MATERIAL USAGE

TECHNICAL FIELD

This disclosure relates generally to electrified vehicle battery packs. Exemplary battery packs may include an array frame standoff for controlling a gap between a thermal fin of the array frame and an adjacent heat exchanger plate, thereby reducing an amount of a thermal interface material (TIM) that is required to fill the gap.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of battery cells that store energy for powering these electrical loads. The battery cells generate heat during charging and discharging operations. This heat must be dissipated in order to achieve a desired level of battery performance Heat exchanger plates, often referred to as "cold plates," may be used for dissipating the heat. A thermal interface material (TIM) may also be used to increase the thermal conductivity between the battery cells and the heat exchanger plate.

SUMMARY

A battery pack according to an exemplary aspect of the present disclosure includes, among other things, a heat exchanger plate and a battery array positioned against the heat exchanger plate. The battery array includes an array frame and a thermal fin held within the array frame. A standoff of the array frame establishes a gap between the heat exchanger plate and the thermal fin.

In a further non-limiting embodiment of the foregoing battery pack, a second array frame is connected to the array frame.

In a further non-limiting embodiment of either of the foregoing battery packs, the battery array includes a plurality of battery cells, and at least one battery cell of the plurality of battery cells is held within the array frame.

In a further non-limiting embodiment of any of the foregoing battery packs, the standoff protrudes from the array frame in a direction toward the heat exchanger plate.

In a further non-limiting embodiment of any of the foregoing battery packs, the standoff protrudes from a bottom wall of the array frame.

In a further non-limiting embodiment of any of the foregoing battery packs, the standoff is wedge shaped.

In a further non-limiting embodiment of any of the foregoing battery packs, the standoff is rectangular shaped.

In a further non-limiting embodiment of any of the foregoing battery packs, the array frame comprises a second standoff spaced apart from the standoff. The gap extends between the standoff and the second standoff and between the thermal fin and the heat exchanger plate.

In a further non-limiting embodiment of any of the foregoing battery packs, the array frame is a plastic structure, and the thermal fin and the heat exchanger plate are metallic structures.

In a further non-limiting embodiment of any of the foregoing battery packs, the thermal fin includes a leg that extends outside the array frame.

In a further non-limiting embodiment of any of the foregoing battery packs, the gap extends between the leg and the heat exchanger plate.

In a further non-limiting embodiment of any of the foregoing battery packs, the array frame includes a top wall, a bottom wall, and frame arms that extend between the top wall and the bottom wall.

In a further non-limiting embodiment of any of the foregoing battery packs, a thermal interface material is disposed within the gap.

In a further non-limiting embodiment of any of the foregoing battery packs, a structural component is positioned between the heat exchanger plate and a tray.

In a further non-limiting embodiment of any of the foregoing battery packs, the structural component is a foam block or a spring element configured to move the heat exchanger plate into contact with the standoff.

A method according to another exemplary aspect of the present disclosure includes, among other things, positioning a battery array against a heat exchanger plate of a battery pack. The battery array includes an array frame and a thermal fin held within the array frame. The method may further include spacing the heat exchanger plate at a fixed distance from the thermal fin with a standoff of the array frame, and filling a gap between the thermal fin and the heat exchanger plate with a thermal interface material.

In a further non-limiting embodiment of the foregoing method, the thermal fin is insert molded within the array frame, and the standoff is integral with a surface of the array frame.

In a further non-limiting embodiment of either of the foregoing methods, the method includes forcing the heat exchanger plate into contact with the thermal fin with a structural component.

In a further non-limiting embodiment of any of the foregoing methods, the structural component is a foam block or a spring element.

In a further non-limiting embodiment of any of the foregoing methods, forcing the heat exchanger plate includes deflecting the heat exchanger plate in a direction toward the array frame.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include a heat exchanger plate and a battery array positioned against the heat exchanger plate. The battery array may include an array frame and a thermal fin held within the array frame. The array frame may additionally include a standoff for controlling a size of a gap between the thermal fin and the heat exchanger plate, thereby reducing an amount of a thermal interface material (TIM) that must be utilized to fill the gap. These and other features are discussed in greater detail in the following paragraphs of this detailed description.

Figure 1:
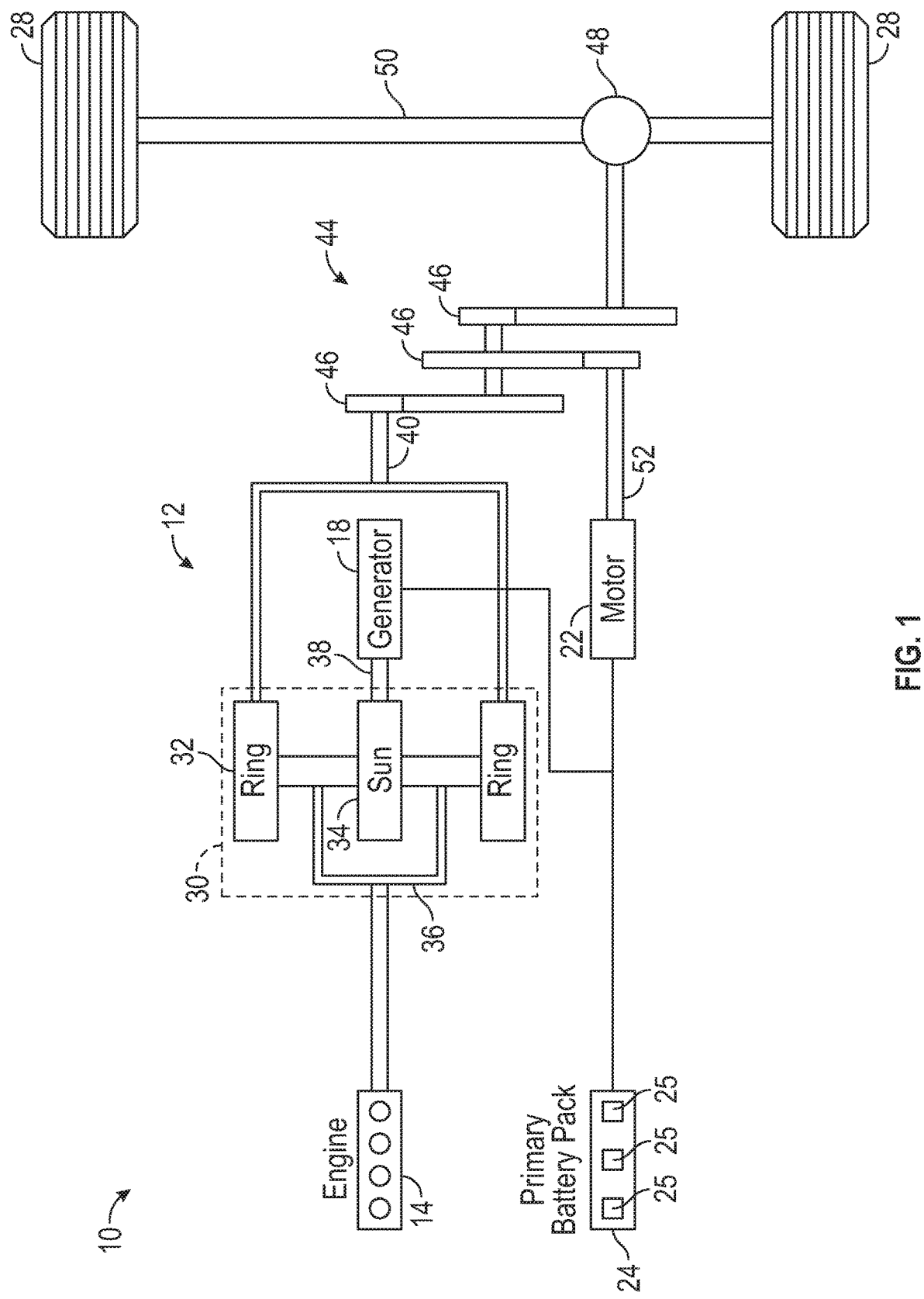
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery. The battery pack 24 may be a high voltage traction battery that includes a plurality of battery arrays 25 (i.e., battery assemblies or groupings of battery cells) capable of outputting electrical power to operate the motor 22 and/or other electrical loads of the electrified vehicle 12 and are capable of receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
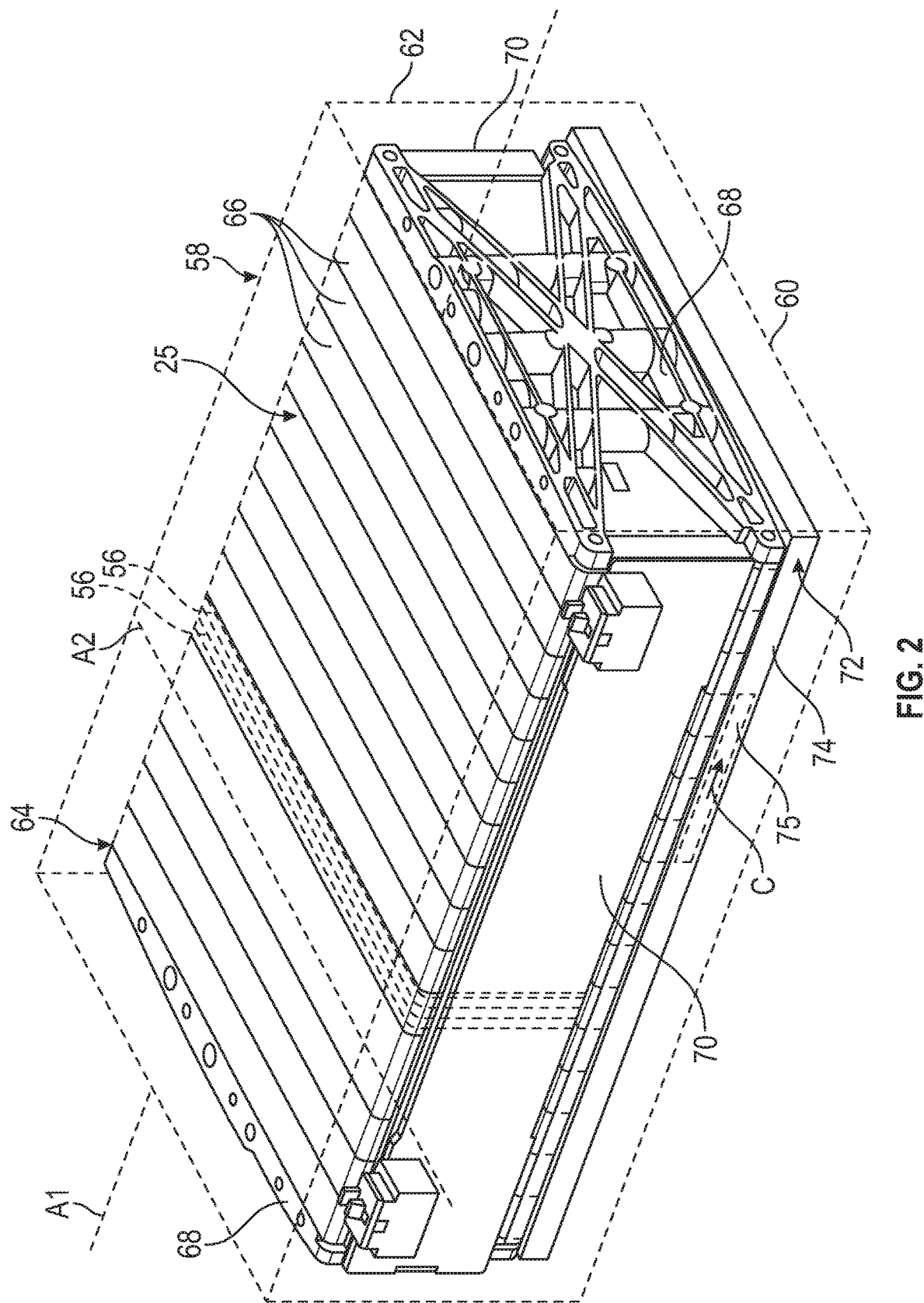
FIG. 2 illustrates a battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1 or any other electrified powertrain. FIG. 2 is a perspective view of the battery pack 24, and some external components (e.g., an enclosure assembly 58) are shown in phantom to better illustrate the internal components of the battery pack 24.

The battery pack 24 houses a plurality of battery cells 56 that store energy for powering various electrical loads of the electrified vehicle 12. Two exemplary battery cells 56 are shown in phantom in FIGS. 2 and 4. However, the battery pack 24 could employ any number of battery cells within the scope of this disclosure, and this disclosure is not limited to the exact configuration shown in FIG. 2.

The battery cells 56 may be arranged in a row to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array 25. Although the battery pack 24 of FIG. 2 is depicted as having a single battery array 25, the battery pack 24 could include a greater number of battery arrays within the scope of this disclosure.

An enclosure assembly 58 houses each battery array 25 of the battery pack 24. In an embodiment, the enclosure assembly 58 is a sealed enclosure that includes a tray 60 and a cover 62 that is secured to the tray 60 to enclose and seal the battery array 25 of the battery pack 24. In another embodiment, the battery array 25 is positioned within the tray 60 of the enclosure assembly 58, and the cover 62 may then be received over the battery arrays 25. The enclosure assembly 58 may include any size, shape, and configuration within the scope of this disclosure.

In an embodiment, the battery cells 56 of the battery array 25 are supported, held, and/or retained together by a support structure 64 disposed around an outer perimeter of the cell stack. The support structure 64 may include a plurality of interconnected array frames 66, opposing end plates 68, and opposing side plates 70. The array frames 66 are stacked side-by-side, assembled together, and positioned between the opposing end plates 68, which are positioned at the longitudinal extents of the battery array 25, and between the opposing side plates 70, which connect between the opposing end plates 68. Therefore, in an embodiment, the battery array 25 extends along a longitudinal axis A1 between the opposing end plates 68, and the array frames 66 each extend along a longitudinal axis A2 that is generally transverse to the longitudinal axis A1.

The battery array 25 may be positioned against (e.g., on top of) a heat exchanger plate 72, sometimes referred to as a cold plate, such that the battery cells 56 are in relatively close proximity to the heat exchanger plate 72. The battery pack 24 could employ one or more heat exchanger plates within the scope of this disclosure.

The heat exchanger plate 72 may be part of a liquid cooling system that is associated with the battery pack 24 and is configured for thermally managing the battery cells 56 of the battery array 25. For example, heat may be generated and released by the battery cells 56 during charging operations, discharging operations, extreme ambient conditions, or other conditions. It may be desirable to dissipate the heat from the battery pack 24 to improve capacity, life, and performance of the battery cells 56. The heat exchanger plate 72 may be configured to conduct the heat out of the battery cells 56. For example, the heat exchanger plate 72 may function as a heat sink for removing heat from the heat sources (i.e., the battery cells 56). The heat exchanger plate 72 could alternatively be employed to heat the battery cells 56, such as during extremely cold ambient conditions, for example. Although shown as a separate component from the tray 60, the heat exchanger plate 72 could alternatively be integrated with the tray 60 as a single component.

The heat exchanger plate 72 may include a plate body 74 and a coolant circuit 75 formed inside the plate body 74. The coolant circuit 75 may include one or more passageways that extend inside the plate body 74. In an embodiment, the coolant circuit 75 establishes a meandering path of passageways inside the plate body 74.

A coolant C from a coolant source (not shown) may be selectively circulated through the coolant circuit 75 to thermally condition the battery cells 56 of the battery pack 24. The coolant source could be part of a main cooling system of the electrified vehicle 12 or could be a dedicated coolant source of the battery pack 24. Although not shown, the coolant C may pass through a heat exchanger before entering the heat exchanger plate 72.

In an embodiment, the coolant C is a conventional type of coolant mixture, such as water mixed with ethylene glycol. However, other coolants, including gases, are also contemplated within the scope of this disclosure.

In use, heat from the battery cells 56 is conducted into the plate body 74 of the heat exchanger plate 72 and then into the coolant C as the coolant C is communicated through the coolant circuit 75. The heat may therefore be carried away from the battery cells 56 by the coolant C.

In an embodiment, the heat exchanger plate 72 is an extruded part. In another embodiment, the heat exchanger plate 72 is made of a metallic material, such as aluminum. However, other manufacturing techniques and materials are also contemplated within the scope of this disclosure.

Figure 3:
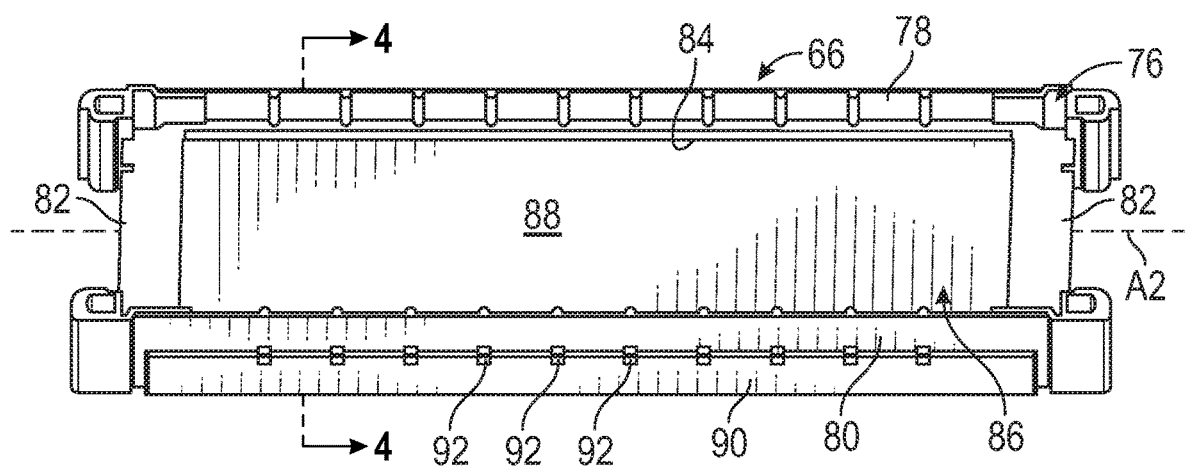
FIG. 3 illustrates an array frame of the battery pack of FIG. 2.
Figure 4:
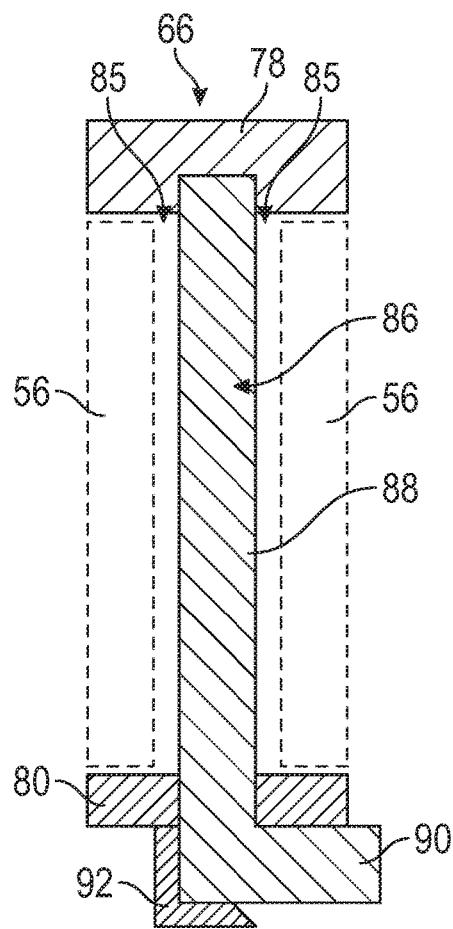
FIG. 4 is a cross-sectional view through section 4-4 of the array frame of FIG. 3.

FIGS. 3 and 4, with continued reference to FIG. 2, illustrate an exemplary array frame 66 of the battery array 25. The array frame 66 may include a frame body 76 extending along the longitudinal axis A2. The frame body 76 may be rectangular shaped (i.e., four sided) and may include a top wall 78, a bottom wall 80, and frame arms 82 that connect between the top wall 78 and the bottom wall 80. In an embodiment, the frame arms 82 are disposed near opposing ends (i.e., near the longitudinal extents) of the top wall 78 and the bottom wall 80. The top wall 78, the bottom wall 80, and the frame arms 82 establish a perimeter around an opening 84 formed through the frame body 76. In an embodiment, the top wall 78 and the bottom wall 80 extend horizontally and in parallel with the longitudinal axis A2 of the frame body 76, and the frame arms 82 extend vertically and transverse to the longitudinal axis A2. When mounted within the battery pack 24 (see FIG. 2), the bottom wall 80 may be closer to the tray 60 and thus establishes a portion of a base of the battery array 25, and the top wall 78 may be closer to the cover 62 and thus establishes a portion of an upper surface of the battery array 25.

The frame body 76 of the array frame 66 may be a unitary, plastic structure. In an embodiment, the top wall 78, the bottom wall 80, and the frame arms 82 are molded, cast, machined, or otherwise manufactured to form a unitary, monolithic structure.

Each opposing side of the frame body 76 may establish a pocket 85 that is sized and shaped to receive a battery cell 56. Each array frame 66 may house either one or two battery cells 56, with each pocket 85 capable of receiving a single battery cell 56.

A thermal fin 86 may be held within the array frame 66 for separating adjacent battery cells 56 from one another. In an embodiment, the thermal fin 86 is a metallic (e.g., aluminum) component that is insert molded within the array frame 66 and is therefore at least partially embedded within the array frame 66. However, the thermal fin 86 can be mounted within the array frame 66 in any known manner and could be made from various materials.

The thermal fin 86 may include a body 88 and a leg 90 that extends from the body 88. In an embodiment, the thermal fin 86 is L-shaped. The body 88 may be embedded or molded into the frame body 76, and the leg 90 may extend outside of the frame body 76. The leg 90 of the thermal fin 86 may be oriented transversely to the body 88 so it extends underneath the bottom wall 80 to a position laterally outward of the frame body 76. As discussed in greater detail below, the leg 90 may contact a thermal interface material for dissipating any heat absorbed by the thermal fin 86 from the battery cells 56.

Due to electrical isolation requirements associated with the high voltage battery pack 24, it is generally undesirable for the thermal fins 86 of the array frames 66 to directly contact the heat exchanger plate 72 of the battery pack 24. A gap (i.e., an open space) may therefore be maintained between the thermal fin 86 and the heat exchanger plate 72 when assembling the battery pack 24. The gap may be filled in with a thermal interface material, which is designed to increase the thermal conductivity between the thermal fin 86 and the heat exchanger plate 72 in order to adequately cool the battery cells 56. However, thermal interface materials are relatively expensive, and it is therefore desirable to reduce the amount of thermal interface materials that are used by controlling the gap between the thermal fin 86 and the heat exchanger plate 72. To this end, the array frame 66 may include one or more standoffs 92 configured for controlling the gap.

In an embodiment, shown in FIGS. 3-4, the array frame 66 may include a plurality of standoffs 92. The standoffs 92 are spaced part from one another and may protrude from a surface of the array frame 66. In the illustrated embodiment, the standoffs 92 protrude outwardly from the bottom wall 80 of the frame body 76 (e.g., in a direction away from the top wall 78). However, the standoffs 92 can be provided at any surface of the array frame 66 that is intended to interface with a heat exchanger, including the top wall 78 or the frame arms 82. The total number of standoffs 92 provided on the array frame 66 is design dependent and is therefore not intended to limit this disclosure.

The standoffs 92 may embody a variety of sizes and shapes. In an embodiment, the standoffs 92 are wedge shaped (see, e.g., FIGS. 4-5). In another embodiment, the standoffs 92 are rectangular shaped (see, e.g., FIGS. 6 and 7).

The standoffs 92 may be an integral component of the array frame 66. In an embodiment, the standoffs 92 are a molded feature of the frame body 76 of the array frame 66.

Figure 5:
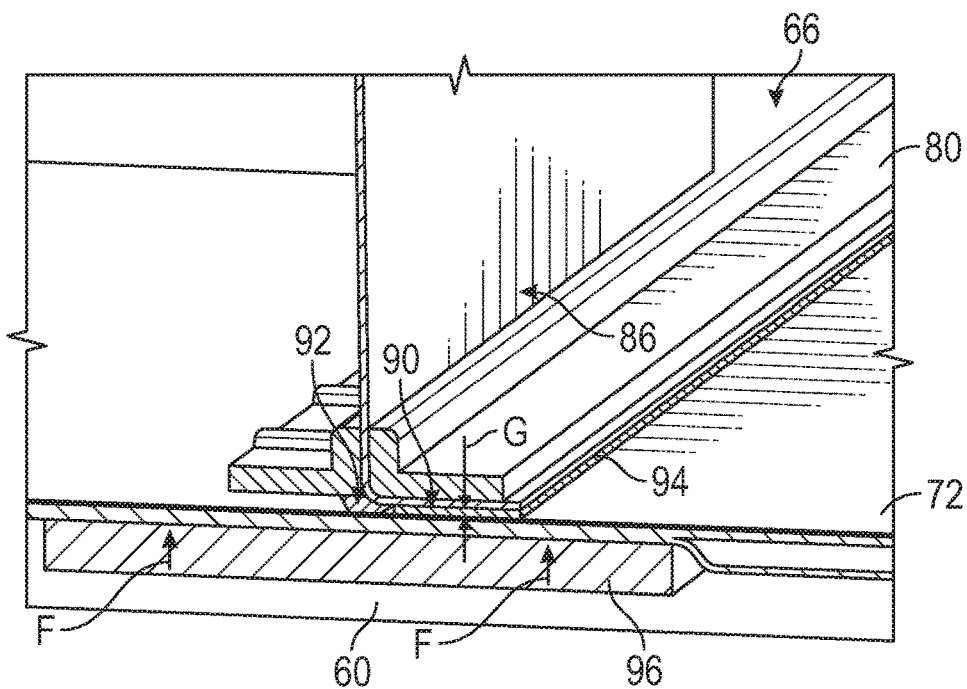
FIG. 5 is a cross-sectional assembly view of a portion of the battery pack of FIG. 2.

Referring now to FIG. 5, the array frame 66 (or a plurality of array frames 66) may be positioned atop of the heat exchanger plate 72 when assembling the battery pack 24. Each standoff 92 acts as a positive stop feature for limiting the distance that the heat exchanger plate 72 can be deflected or otherwise moved toward the leg 90 of the thermal fin 86. The standoffs 92 therefore may establish one or more gaps G between the thermal fin 86 and the heat exchanger plate 72. Stated another way, the standoffs 92 space the heat exchanger plate 72 at a fixed distance from the thermal fin 86. In an embodiment, each gap G extends between adjacent standoffs 92 and between the leg 90 of the thermal fin 86 and the heat exchanger plate 72.

The gap(s) G may be filled with a thermal interface material (TIM) 94. The TIM 94 maintains thermal contact between the thermal fin 86 and the heat exchanger plate 72, thereby increasing the thermal conductivity between these neighboring components in order to pull heat out of the battery cells 56. In an embodiment, the TIM 94 includes an epoxy resin. In another embodiment, the TIM 94 includes a silicone based material. Other materials, including thermal greases, may alternatively or additionally make up the TIM 94.

A structural component 96 may be positioned between the tray 60 and the heat exchanger plate 72. In an embodiment, the structural component 96 is a foam block, such as an expanded polymer-based foam block. In another embodiment, the structural component 96 is a spring element. The structural component 96 may be configured to apply a force F against the heat exchanger plate 72. The force F may move, deflect, or bias the heat exchanger plate 72 into direct contact with the standoffs 92, thereby collapsing each gap G to its minimum allowable size and eliminating the need for excess amounts of the TIM 94.

Figure 6:
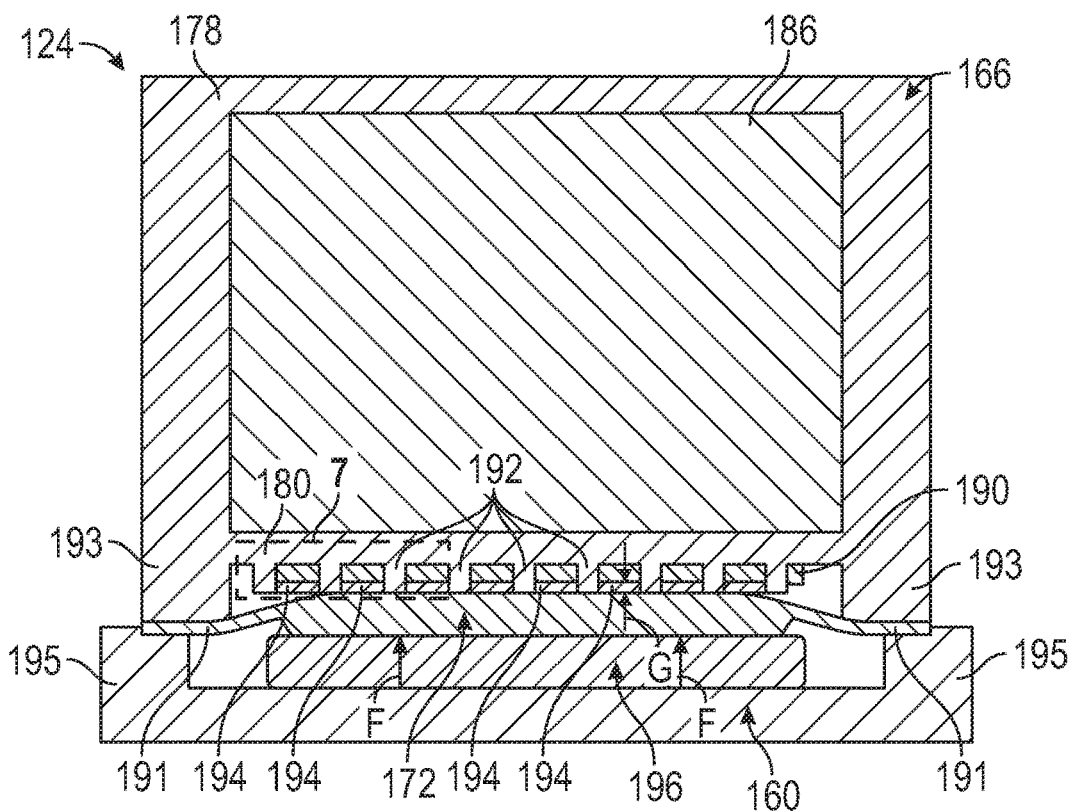
FIG. 6 schematically illustrates portions of another exemplary battery pack.
Figure 7:
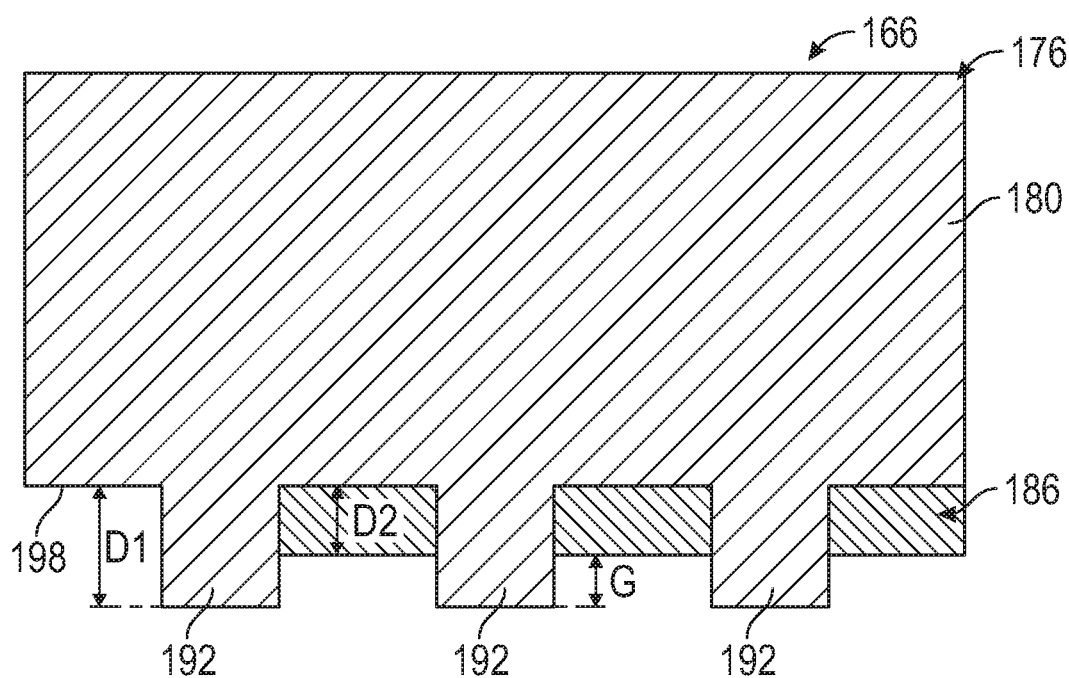
FIG. 7 is a blown up view of a portion of FIG. 6.

FIGS. 6 and 7 illustrate portions of another exemplary battery pack 124. It should be understood that FIGS. 6 and 7 are not necessarily drawn to scale. Many features of the battery pack 124 are shown schematically and have been exaggerated in an effort to better illustrate the various features and advantages of this disclosure.

The battery pack 124 may include an array frame 166, a heat exchanger plate 172, a structural component 196, and a tray 160. The structural component 196 may be positioned against the tray 160, the heat exchanger plate 172 may be positioned against the structural component 196, and the array frame 166 may be positioned against the heat exchanger plate 172.

In an embodiment, outer flanges 191 of the heat exchanger plate 172 are sandwiched between mounting feet 193 of the array frame 166 and a mounting flange 195 of the tray 160. A bottom wall 180 of the array frame 166 may be recessed from the mounting feet 193 in a direction toward a top wall 178 of the array frame 166.

A plurality of standoffs 192 may protrude from the bottom wall 180 in a direction toward the heat exchanger plate 172. The standoffs 192 act as positive stop features for limiting the distance that the heat exchanger plate 172 can move toward a thermal fin 186 of the array frame. The standoffs 192 therefore establish a gap G between the thermal fin 186 and the heat exchanger plate 172. The gap G may be filled with a thermal interface material (TIM) 194. The structural component 196 may be configured to apply a force F against the heat exchanger plate 172. The force F may deflect the heat exchanger plate 172 into direct contact with the standoffs 192, thereby collapsing the gap G to its minimum allowable size and eliminating the need for excess amounts of the TIM 94.

As best shown in FIG. 7, the standoffs 192 may protrude a first distance D1 from an outer surface 198 of the bottom wall 180 of the array frame 166, and the thermal fin 186 may extend a second distance D2 beyond the outer surface 198. In an embodiment, the first distance D1 is a greater distance than the second distance D2. The difference between the first distance D1 and the second distance D2 establishes the size of the gap G.

Figure 8:
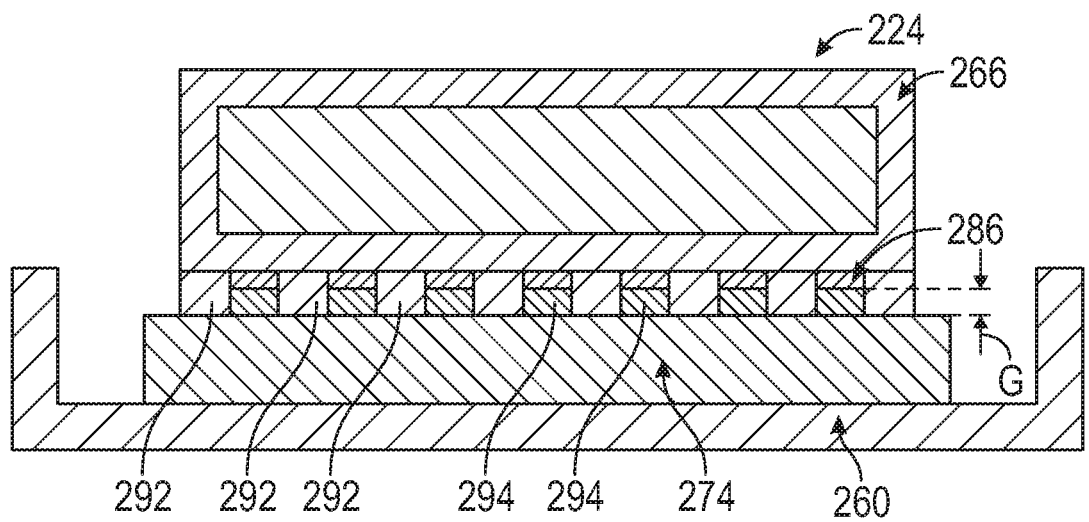
FIG. 8 illustrates portions of yet another exemplary battery pack.

FIG. 8 illustrates portions of another exemplary battery pack 224. The battery pack 224 is similar to the battery pack 24 except that the structural component 96 is not utilized in this design. The battery pack 224 therefore may include an array frame 266, a heat exchanger plate 272, and a tray 160.

In this embodiment, the heat exchanger plate 272 is positioned against the tray 260, and the array frame 266 is positioned against the heat exchanger plate 272. Standoffs 292 of the array frame 266 establish a fixed gap G between a thermal fin 286 of the array frame 266 and the heat exchanger plate 272. The gap G may be filled with a thermal interface material (TIM) 294.

The battery pack designs of this disclosure utilize battery array frame standoff features that act as positive stops for controlling a gap between a thermal fin of each array frame and an adjacently positioned heat exchanger plate. By controlling the gap between the thermal fin and the heat exchanger plate, the amount of thermal interface material required to fill the gap can be tightly controlled. The proposed array frame designs therefore reduce assembly complexity and costs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
 a heat exchanger plate;
 a battery array positioned against the heat exchanger plate, the battery array including an array frame and a thermal fin held within the array frame,
 wherein the array frame includes a pair of mounting feet,
 wherein the pair of mounting feet is an integral feature of a plastic frame body of the array frame;
 a standoff of the array frame establishing a gap between the heat exchanger plate and the thermal fin,
 wherein the standoff is a separate feature of the array frame from the pair of mounting feet; and
 a thermal interface material disposed within the gap.

2. The battery pack as recited in claim 1, comprising a second array frame connected to the array frame.

3. The battery pack as recited in claim 1, wherein the battery array includes a plurality of battery cells, and at least one battery cell of the plurality of battery cells is held within the array frame.

4. The battery pack as recited in claim 1, wherein the standoff protrudes from the array frame in a direction toward the heat exchanger plate, and further wherein the standoff protrudes from a bottom wall of the array frame.

5. The battery pack as recited in claim 1, wherein the standoff is wedge shaped or rectangular shaped.

6. The battery pack as recited in claim 1, wherein the array frame comprises a second standoff spaced apart from the standoff, wherein the gap extends between the standoff and the second standoff and between the thermal fin and the heat exchanger plate.

7. The battery pack as recited in claim 1, wherein the array frame is a plastic structure, and the thermal fin and the heat exchanger plate are metallic structures.

8. The battery pack as recited in claim 1, wherein the thermal fin includes a leg that extends outside the array frame, and further wherein the gap extends between the leg and the heat exchanger plate.

9. The battery pack as recited in claim 1, wherein the array frame includes a top wall, a bottom wall, and frame arms that extend between the top wall and the bottom wall.

10. The battery pack as recited in claim 1, comprising a structural component positioned between the heat exchanger plate and a tray, wherein the structural component is a foam block or a spring element configured to move the heat exchanger plate into contact with the standoff.

11. A method, comprising:
 positioning a battery array against a heat exchanger plate of a battery pack, wherein the battery array includes an array frame having a pair of mounting feet and a thermal fin held within the array frame,
 wherein the pair of mounting feet is an integral feature of a plastic frame body of the array frame;
 spacing the heat exchanger plate at a fixed distance from the thermal fin with a standoff of the array frame,
 wherein the standoff is received in direct contact with the heat exchanger plate and is a separate feature of the array frame from the pair of mounting feet; and
 filling a gap between the thermal fin and the heat exchanger plate with a thermal interface material.

12. The method as recited in claim 11, wherein the thermal fin is insert molded within the array frame, and the standoff is integral with a surface of the array frame.

13. The method as recited in claim 11, comprising:
 forcing the heat exchanger plate into contact with the thermal fin via a structural component.

14. The method as recited in claim 13, wherein the structural component is a foam block or a spring element, and further wherein forcing the heat exchanger plate includes deflecting the heat exchanger plate in a direction toward the array frame.

15. The battery pack as recited in claim 2, wherein the array frame and the second array frame each include a unitary, plastic structure.

16. The battery pack as recited in claim 1, wherein the heat exchanger plate is part of a liquid cooling system of the battery pack, and further wherein the heat exchanger plate includes a plate body and a coolant circuit formed inside the plate body and configured to receive a coolant of the liquid cooling system.

17. The battery pack as recited in claim 6, wherein the standoff and the second standoff are integral features of the array frame, and further wherein the standoff directly contacts the heat exchanger plate at a first location of the heat exchanger plate and the second standoff directly contacts the heat exchanger plate at a second, different location of the heat exchanger plate.

18. The battery pack as recited in claim 1, wherein the heat exchanger plate and the battery array are enclosed inside an enclosure assembly of the battery pack.

19. A battery pack, comprising:
 an enclosure assembly;
 a heat exchanger plate positioned against a portion of the enclosure assembly,
 wherein the heat exchanger plate includes a plate body and a coolant circuit inside the plate body;
 a battery array positioned against the heat exchanger plate at a position inside the enclosure assembly, wherein the battery array includes a plastic array frame, a thermal fin held within the plastic array frame, and a battery cell received within a pocket of the plastic array frame, wherein the plastic array frame includes a pair of mounting feet, wherein the pair of mounting feet is an integral feature of a plastic frame body of the plastic array frame;

a standoff of the array frame establishing a gap extending between the heat exchanger plate and the thermal fin, wherein the standoff is a separate feature of the plastic array frame from the pair of mounting feet, wherein the standoff is an integral feature of the plastic frame body of the plastic array frame and is received in direct contact with the heat exchanger plate; and a thermal interface material positioned within the gap.

20. The battery pack as recited in claim 1, wherein a first mounting foot of the pair of mounting feet is located at a first longitudinal extent of the plastic frame body of the array frame and a second mounting foot of the pair of mounting feet is located at a second longitudinal extent of the plastic frame body of the array frame, and further wherein the standoff is spaced apart from both the first longitudinal extent and the second longitudinal extent.

* * * * *